Jan. 5, 1971                 G. SIEGLER               3,552,758
DEVICE FOR AUTOMATICALLY COUPLING AN INSERT
MEMBER TO A DRIVING MEMBER
Filed Oct. 28, 1968
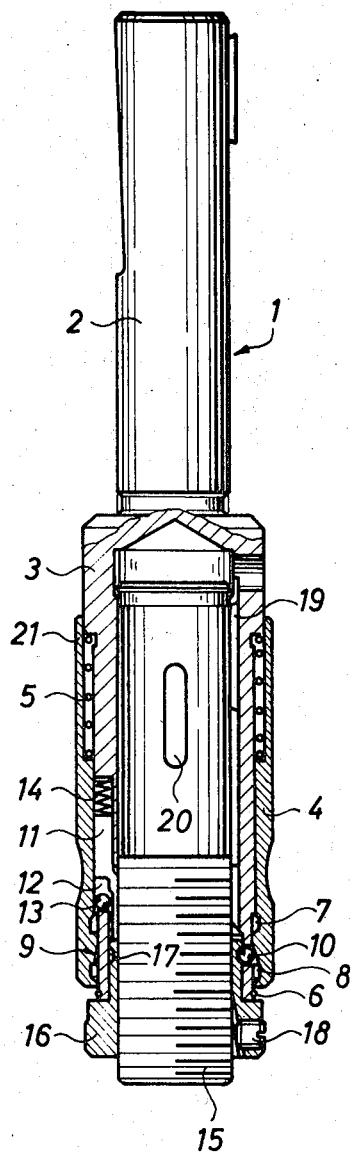
INVENTOR.
GUSTAV SIEGLER,
BY Jacobi & Davidson.

United States Patent Office 3,552,758
Patented Jan. 5, 1971

3,552,758
DEVICE FOR AUTOMATICALLY COUPLING AN INSERT MEMBER TO A DRIVING MEMBER
Gustav Siegler, 34 Kirchheimerstrasse, 7317 Wendlingen (Neckar), Germany
Filed Oct. 28, 1968, Ser. No. 771,264
Int. Cl. B23b *31/22*
U.S. Cl. 279—75                 3 Claims

ABSTRACT OF THE DISCLOSURE

A device for automatically coupling an insert member to a driving member, in particular an adjusting sleeve or toolholder to a machine-tool chuck. Said two members are coupled with the aid of radially shiftable coupling means and fixed in their coupled position with the aid of an axially shiftable coupling piece. A locking member fixedly locates said coupling piece in an ineffective position, and at least one blocking member fixedly locates the locking member in its locked position. A portion of the blocking member takes up said locking member as a whole and is brought to its effective position by shifting the blocking member when placing the insert member or toolholder into the chuck whereby the locking member is disengaged from its locking position.

BACKGROUND OF THE INVENTION

In one type of conventional machine-tool quick-action chuck a toolholder is coupled to the chuck by means of a set of balls disposed radially displaceable in a hollow cylindrical chuck portion, and these balls are held in their coupling position by means of an axially displaceable bushing. When coupling the toolholder to the chuck, the bushing has to be moved by hand so far that each of said balls will move radially outwards from its coupling position in which it is engaged in a toolholder recess. To remove the holder from the chuck, similar manipulation is required.

The present invention is designed to permit convenient and quick insertion and removal of the holder into and from the chuck. No additional manipulation is required for coupling the toolholder to the chuck, since such coupling operation is done automatically upon insertion of the holder into the chuck. When removing the holder from the chuck, said coupling piece merely has to be shifted.

SUMMARY OF THE INVENTION

The automatic quick-action chuck embodying the invention is characterized in that the coupling piece has to be fixedly located by a locking member in an ineffective position, and the locking member has to be fixedly located by at least one blocking member in its blocking position. A portion of the blocking member is adapted to receive the whole locking member and upon insertion of the holder is brought to its effective position by shifting the locking member, whereby the latter is released from the locking position.

Advantageously, the coupling piece is recessed to receive a ball that constitutes the locking member and that is disengaged from its coupling position by means of the locking member which is displaceable in axial parallel relation to the chuck.

The groove-guided locking member conveniently has a stepped recess for alternately receiving said ball, and a spring disposed between locking member and chuck tends to hold the locking member in locking position.

Appropriately, a spring located between the chuck and the coupling piece holds the latter in its coupling position.

Suitably the coupling piece adjacent to its recess has a conical surface for receiving the balls and holding same in locking position.

The adjusting sleeve or toolholder conveniently carries a nut that has an annular groove for engaging the locking balls.

The coupling piece suitably comprises an axial extension on its end that supports the spring clampedly engaged between chuck and coupling piece, said extension covering the spring on the outside, thus reducing the accident risk as well as fouling of the spring.

BRIEF DESCRIPTION OF THE DRAWING

In the drawing the single figure shows schematically and in partial longitudinal section a preferred embodiment of the invention in the form of a quick-action chuck which is insertable in a driving spindle of a machine tool and has an adjusting sleeve or toolholder inserted therein.

DESCRIPTION OF A PREFERRED EMBODIMENT

A driving member 1 in the form of a quick-action chuck has a shank part 2 to be received in an axially movable driving spindle (not shown) of a machine tool, and a sleeve part 3. On the latter is axially movably mounted a bushing-like coupling piece 4. Between a shoulder on sleeve part 3 and a shoulder on coupling piece 4 is fixedly located a spring 5 which tends to displace the coupling piece 4 towards the free end of sleeve part 3. The path of shifting the coupling piece 4 is limited by a spring ring 6 inserted in a groove on the free end of sleeve part 3. The coupling piece on its end adjacent to spring ring 6 comprises two annular grooves 7 and 8. A conical face 9 adjoins annular groove 8 on the side of annular groove 7. In the range of annular groove 8 and conical face 9 the sleeve part 3 comprises a set of three equidistant blocking balls 10 of which only one is shown in the drawing. Radial bores in sleeve part 3 for accommodating the blocking balls 10 are constricted inside of sleeve part 3 so that none of the balls 10 can leave its bore inwardly, neither can the balls leave outwardly owing to coupling piece 4.

A blocking member 11 is mounted axially movable in a groove on the outside of sleeve part 3. This member 11 has a stepped recess 12 for receiving a locking member in form of a ball 13. Recess 12 decreases in size towards the midpoint of member 11 and, at a distance therefrom, is slightly larger than the ball diameter. Ball 13, therefore, can only lodge in the constricted portion of recess 12 if it can additionally project into annular groove 7 of coupling piece 4. Between blocking member 11 and sleeve part 3 is engaged a spring 14 which tends to push the blocking member 11 towards ball 13. The blocking member 11 could be annular, comprising incisions or cuts for passage of the balls therethrough.

A plurality of such blocking members 11 may be provided.

In sleeve part 3 is inserted an adjusting sleeve 15 as insertion member which serves to receive a tool (not shown). Onto adjusting sleeve 15 is screwed a nut 16 that has an axial extension of smaller diameter which comprises an annular groove 17, and the blocking balls 10 are engaged in said groove 17 upon insertion of sleeve 15 into sleeve part 3. Nut 16 is secured to sleeve 15 by means of a clamping screw 18. Sleeve 15 carries a key 19 located in a groove of sleeve part 3. A continuous longitudinal slot 20 serves for withdrawing a tool sticking in sleeve 15. An extension 21 of coupling piece 4 covers spring 5 outwardly to minimize accident risk and fouling spring 5.

To withdraw sleeve 15 from chuck 1, coupling piece 4 is moved towards shank part 2 against the action of spring 5. Thereby the blocking balls 10 can move out of groove 17 on nut 16 into annular groove 8, and blocking ball 13 can move into groove 7 on coupling piece 4. Spring 14 then moves the released blocking member 11 towards ball 13. Owing to its abutment against nut 16, sleeve 15 connected to the latter thus is shifted correspondingly. Coupling piece 4 then is fixedly located by ball 13 in its position which is shifted with respect to sleeve part 3. Sleeve 15 thus has been released from the balls 10 and can fall out from shank part 2, as the latter is open downwardly.

Upon insertion of sleeve 15 into sleeve part 3, nut 16 abuts against blocking member 11 and displaces same against the action of spring 14 so that ball 13 will enter into the wider recess portion and thus leave annular groove 7, and coupling piece 4 under the action of spring 5 is moved towards spring ring 6. The blocking balls 10 thus leave annular groove 8 and are pushed radially inwards by the conical face 9 so that a connection free of play is established between sleeve part 3 and nut 16 via the blocking balls and coupling piece 4.

If coupling piece 4 for the purpose of obtaining a smaller diameter has to be made of lesser wall thickness than shown in the drawing, the axial extension 21 on coupling piece 4 may be omitted.

I claim:
1. In a device for the automatic coupling of an insert member with a driving member, especially of an adjusting sleeve which can be inserted into a machine tool chuck, a plurality of radially shiftable coupling members for coupling the insert member and the driving member, an axially shiftable coupling piece for securing the coupling members in their coupled position, a locking member for securing said coupling piece in its ineffective position, a blocking member for securing said locking member in its blockng position, said coupling piece possessing a recess for receiving a ball which serves as said locking member, said ball being situated between the coupling piece and the blocking member, said blocking member being guided in a groove and possessing a stepped recess for receiving the ball in two different radial positions, said recess being smaller than the diameter of said ball towards the middle of said blocking member and slightly greater than the diameter of said ball at a small distance from the middle of said blocking member, a spring engaged between said blocking member and said driving member tending to hold said blocking member in the locking position, a spring clamped between said driving member and said coupling piece tending to retain said coupling piece in its coupling position, said insert member having a lock nut possessing a shoulder having an annular groove, said coupling members engaging said annular groove when inserted into said driving member, said blocking member being supported at said shoulder with its supported part receiving the blocking ball for releasing the blocking position.

2. A chuck as set out in claim 1 in which the coupling piece adjoining its recess has a conical face for holding the balls in their locking position.

3. A chuck as set out in claim 1 in which the coupling piece on its end that supports the spring engaging the driving member and the coupling piece comprises an axial extension which covers the spring outwardly.

References Cited

UNITED STATES PATENTS 2,459,649    1/1949    Jahrl _____ 279—75

FOREIGN PATENTS 342,678    1931    England _____ 279—75

ROBERT C. RIORDON, Primary Examiner

D. D. EVENSON, Assistant Examiner

U.S. Cl. X.R.

279—82